(No Model.)
2 Sheets—Sheet 1.
G. CASTAN.
MIRROR MAZE.
No. 545,678. Patented Sept. 3, 1895.
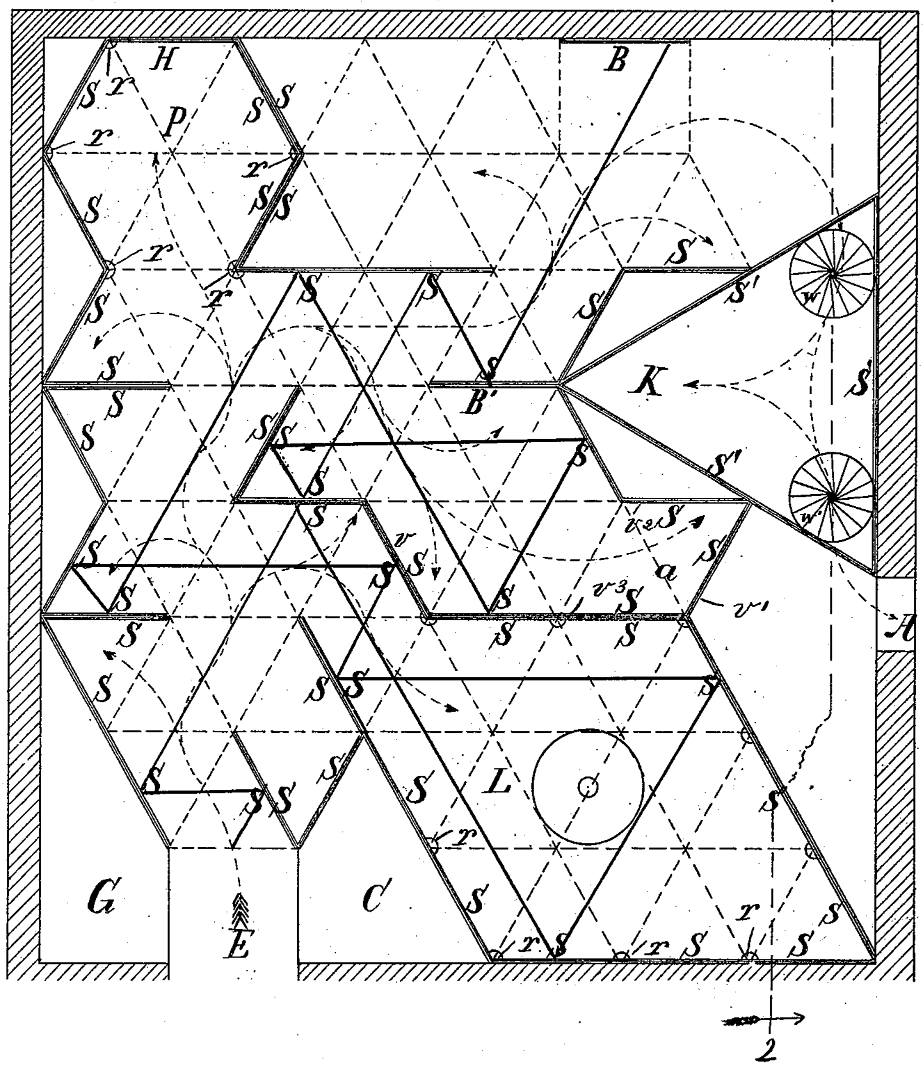
Witnesses:
Gustave Oelrichs,
Jacob Keller.
Inventor:
Gustav Castan
per: pp. a. G. Adolf Hartz
Attorney.

(No Model.)
2 Sheets—Sheet 2.
G. CASTAN.
MIRROR MAZE.
No. 545,678.
Patented Sept. 3, 1895.
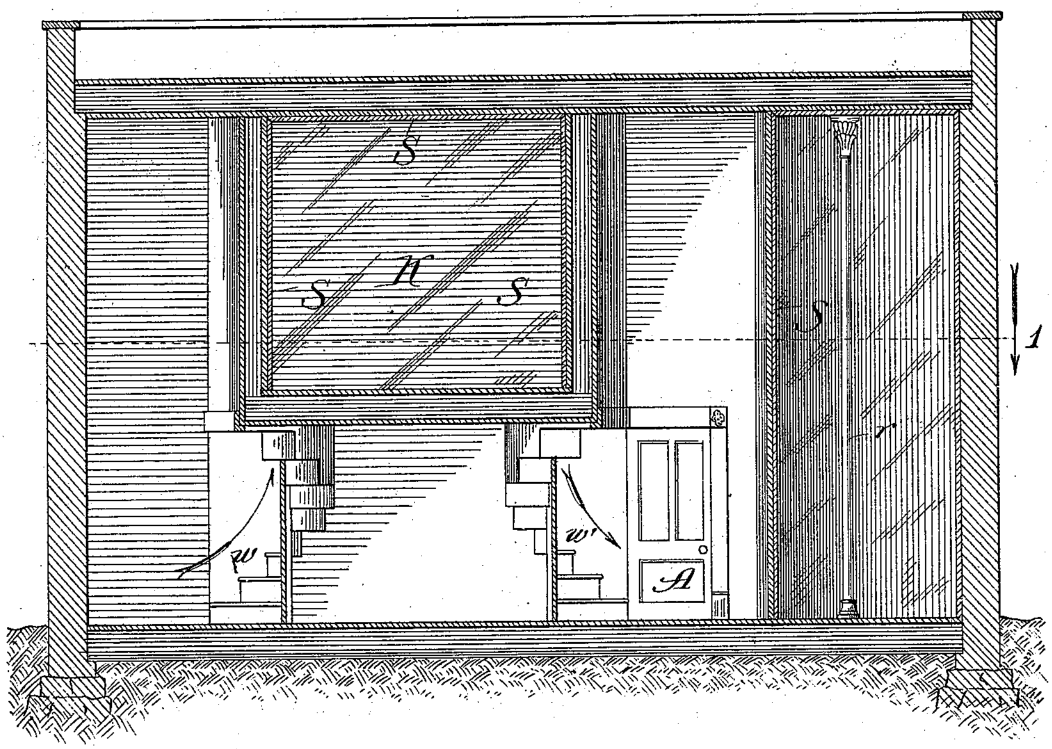
Witnesses:
Chas. E. Gaylord,
Lute S. Alter
Inventor
Gustav Castan,
By Dyrenforth and Dyrenforth,
Att'ys.

UNITED STATES PATENT OFFICE.

GUSTAV CASTAN, OF BERLIN, GERMANY.

MIRROR-MAZE.

SPECIFICATION forming part of Letters Patent No. 545,678, dated September 3, 1895.

Application filed January 6, 1891. Serial No. 376,910. (No model.) Patented in France September 8, 1888, No. 192,868; in Belgium September 12, 1888, No. 83,240, and in England October 21, 1889, No. 16,593.

*To all whom it may concern:*

Be it known that I, GUSTAV CASTAN, a subject of the Emperor of Germany, residing at Berlin, Germany, have invented certain new and useful Mirror-Mazes, (for which I have received Letters Patent in France September 8, 1888, No. 192,868; in Belgium September 12, 1888, No. 83,240, and in England October 21, 1889, No. 16,593;) and I do hereby declare that the following is a full, clear, and exact description of the invention.

The primary object of my invention is to provide such an arrangement of mirrors in a room or inclosure as shall cause them, by their reflection of objects suitably located with relation to the mirrors, to present to the vision of a person in the apartment the illusion of a labyrinthian device composed of seemingly endless passages, which appear to him to be freely traversable until he is stopped in his course by an obstructing mirror, from which long passages seem to extend to the right and to the left.

In the description which follows of the construction of my improved apparatus, reference is had to the accompanying drawings, in which—

Figure 1 is a section taken at the line 1 on Fig. 2 and viewed in the direction of the arrow to present a ground plan of my mirror-maze invention, and Fig. 2 is a section taken at the line 2 on Fig. 1 and viewed in the direction of the arrow.

In a building or room, preferably rectangular in cross-section, are mounted a number of mirrors S, so as to form the sides and ends of passages.

The dotted lines arranged in Fig. 1 to produce equilateral triangles represent the architectural lines into which the apartment must be divided, in the sense that all objects placed in the maze to produce the desired illusionary effect—thus the mirrors and such other objects as pillars $r$, pictures indicated at B and B′, and figures and trees (not shown)—must be placed at points on these lines or on lines parallel with them. Each mirror S that is provided, therefore, forms a side of one of the equilateral triangles, so that all the mirrors are of the same width, and they should be alike in height and in the matter of their fames or borders to cause them to reflect from one compartment into another similar forms or outlines, and people in the passages or compartments formed by the mirrors and other objects set upon the architectural lines referred to. Thus is produced an immense number of images of the frames and other objects in different positions. With all the frames or borders thus similar in shape and size and producing a multiplicity of images by reflection persons not initiated will have much difficulty in finding the shortest way from the entrance E to a kaleidoscope K (hereinafter described) or to the exit A. It will be noticed that the mirrors S which form the passage that proceeds from opposite sides of the entrance E are placed parallel in oblique relation to the entrance, so that a person advancing through the relatively-oblique passage will only be brought face to face with his own image on nearing the mirror S forming the partition which obstructs his path in that direction, and his delusion may only be dispelled by his contact with the obstructing mirror, and the same arrangement is observed throughout the maze.

The dotted lines terminating as arrows in Fig. 1 merely denote where a visitor enters and may ramble about in the mirror-maze.

A picture indicated at B, and which may be drawn or otherwise provided on a wall or partition, appears to be at the extreme end of an immensely long avenue to a person at the entrance E, being there visible to him owing to the reflections along the unbroken line shown as starting from the picture and ending at the entrance, and by following which the course of the reflection from the picture to the entrance may be traced. Another picture, indicated at B′, is reflected only four times—namely, first to the mirror at $v$, thence to the mirror at $v'$, thence to the mirror at $v^2$, and thence to the mirror at $v^3$.

As I have constructed this mirror-maze it contains a rhombic compartment L in imitation of the Lion Court of the Alhambra. By reason of the relative positions of the mirrors which form the walls of the compartment and of the colums $r$ applied to them the forest of columns, which in reality occupies an immense space, is artificially reproduced on a surface scarcely one one-hundredth part of the area of the original.

In the same aforesaid construction the compartment denoted at P represents a tropical garden, the background H of which appears as the entrance to a Moorish temple, while palms and exotic plants are placed on the architectural lines between the mirrors, upon which, moreover, pillars *r* are also applied. Owing to the multiple reflection the single entrance appears like an entire mosque, surrounded by a tropical garden. The space in which the visitor stands occupies scarcely two square meters, but the whole resembles a great palm-garden in a tropical country.

My invention may also include a specially constructed kaleidoscope K, represented in the shape of a regular tetrahedron, having three sides formed of the three mirrors S′ arranged to form a triangle, and the edges of which are ground and fitted together, so that the whole appears to be made of one piece. The base of the chamber K is supported above the plane of the floor of the mirror-maze proper, and the kaleidoscope-chamber is accessible only from below through a spiral stairway *w*, and a second spiral stairway *w′* serves as the exit which leads to the exit A. The visitor, ascending the spiral stairway *w*, sees a great number of repetitions of his own image from the front, from the back, and from both sides. Four or five persons standing at the same time in the kaleidoscope appear as an immense crowd.

At one side of the entrance E to the maze there may be provided a cashier's room, indicated at C, and at the opposite side a cloak-room, indicated at G, may be provided.

The apparatus, as shown by the drawings, may of course be modified to suit various requirements without departing from the principle of my invention.

The following are considered important or desirable features in the construction: first, that the mirrors, and also the passages, shall be inclined to each other at an angle of sixty degrees, or multiples of sixty degrees, and placed on architectural lines forming equilateral triangles; second, that the mirrors and passages shall present a uniform appearance in width and height, as well as in the shape, size, and design or decoration of the frames or borders, and, third, that the kaleidoscope K shall prescribe a chamber, accessible only from below, having its sides composed of mirrors forming the three adjoining sides of a regular tetrahedron, and thus placed in relation to each other and to the floor at an angle of sixty degrees.

What I claim as new, and desire to secure by Letters Patent, is—

1. In a mirror-maze, the combination of mirrors and passages relatively disposed to produce, by reflection, the illusionary effect of a labyrinthian device, substantially as described.

2. In a mirror-maze, the combination of mirrors forming passages and partitions in a labyrinthian device, the individual mirrors and passages corresponding in width and height and in the shape, size and decoration of their frames or borders, and being arranged on lines forming equilateral triangles, substantially as described.

3. In a mirror-maze, the combination of mirrors S forming passages and partitions in a labyrinthian device, and arranged on lines forming equilateral triangles, and objects, such as the pictures B, B′, stationarily arranged in said passages, to be reflected by the mirrors, substantially as described.

4. A mirror-maze comprising, in combination, mirrors S forming passages and partitions in a labyrinthian device, and arranged on lines forming equilateral triangles, and a chamber P formed in the maze of such mirrors and provided with a background H, substantially as described.

5. A kaleidoscope formed of a chamber K accessible from below and bounded by equilateral triangles forming a regular tetrahedron, the sides of which are mirrors fitted together, substantially as described.

In testimony whereof I have signed this specification in the presence of two subscribing witnesses.

GUSTAV CASTAN.

Witnesses:

GUSVAVE OELRICHS,

JACOB KELLER.